(12) United States Patent
Squires

(10) Patent No.: US 7,255,556 B1
(45) Date of Patent: Aug. 14, 2007

(54) METHOD AND APPARATUS FOR CONVEYING POWDER AND HEAT

(76) Inventor: Arthur M. Squires, P.O. Box 10098, Blacksburg, VA (US) 24062

( * ) Notice: Subject to any disclaimer, the term of this patent is extended or adjusted under 35 U.S.C. 154(b) by 336 days.

(21) Appl. No.: 11/071,161

(22) Filed: Mar. 4, 2005

Related U.S. Application Data

(60) Provisional application No. 60/549,548, filed on Mar. 4, 2004.

(51) Int. Cl.
*F27B 15/00* (2006.01)
(52) U.S. Cl. .......................... 432/215; 432/27; 432/58
(58) Field of Classification Search .................. 432/27, 432/58, 197, 215, 219, 220
See application file for complete search history.

(56) References Cited

U.S. PATENT DOCUMENTS

| 3,268,264 | A |   | 8/1966 | Squires |   |
| 3,719,193 | A | * | 3/1973 | Doyle | ........................ 137/38 |
| 4,258,779 | A | * | 3/1981 | Musschoot | ............. 165/104.18 |
| 4,537,571 | A | * | 8/1985 | Buxel et al. | ................... 432/27 |
| 2005/0106279 | A1 | * | 5/2005 | Yerian et al. | ............... 425/256 |

OTHER PUBLICATIONS

Squires et al.; *Fluid Beds: At Last, Challenging Two Entrenched Practices*; Science, Dec. 20, 1985; vol. 230, No. 4732; pp. 1329-1337.
B. Thomas et al.; *Identifying States in Shallow Vibrated Beds*; Powder Technology, 1989: vol. 57; pp. 267-280.
B. Thomas et al.; *Some behaviors of shallow vibrated beds across a wide range in particle size and their implications for powder classification*; Powder Technology, 2000; vol. 111; pp. 34-49.

* cited by examiner

*Primary Examiner*—Gregory Wilson
(74) *Attorney, Agent, or Firm*—James Creighton Wray

(57) ABSTRACT

An apparatus and method for the horizontal conveying of a dry powder is provided, notably useful for conveying heat from a heat-producing operation to a heat-consuming operation. In this application, heat is conveyed by a hot powder flowing through a vertically vibrated duct, the intensity of the vibration being sufficient to place the powder in a liquid-like state. The flow of powder is accompanied by a fall in pressure, and there is included a step for raising the pressure of the powder.

10 Claims, 1 Drawing Sheet

METHOD AND APPARATUS FOR CONVEYING POWDER AND HEAT

This application claims the benefit of U.S. Provisional Application No. 60/549,548, filed Mar. 4, 2004. U.S. Provisional Application No. 60/549,548, filed Mar. 4, 2004 is hereby incorporated by reference in its entirety.

FIELD OF THE INVENTION

The invention relates to horizontal conveying of a dry powder; to horizontal conveying of powder and heat; to disposing of heat from an exothermic chemical process; to supplying heat to an endothermic chemical process; to supplying heat for raising steam; to recovering heat from nuclear fission or solar radiation; and supplying the heat to steam-raising or chemical processing.

BACKGROUND OF THE INVENTION

Chemical processing industries employ condensed-ring aromatic hydrocarbon liquids (for example, DOWTHERM) to convey heat, either supplying heat to endothermic chemical processes or carrying heat away from exothermic processes. The usefulness of such heat-carrying media is limited to temperatures below about 370 C, because their rate of decomposition (with production of a carbon residue) becomes too rapid at higher temperatures. For temperatures higher than about 370 C, chemical processing industries are obliged to use far less convenient heat carriers, such as molten salts or mercury vapor. There is need for a chemically stable, easy-to-handle heat carrier, suitable for use across a wide spectrum of temperatures including those beyond reach today even through use of molten salts or mercury vapor. Endothermic chemical transformation processes are under consideration for temperatures beyond 1,000 C (heat from nuclear fission or solar radiation sometimes being proposed to promote these processes); a medium for delivering heat at such temperatures would bring these suggestions closer to realization.

Chemical processing industries may also advantageously use means for collecting and distributing heat widely, across relatively long distances, throughout a large ground area typically covered by a major chemical processing complex, which typically includes many operations, some exothermic and others endothermic.

An ideal carrier for conveying heat long distances and at high temperatures would be a chemically stable powder. Comminuted solids, including both fine powders and larger moieties, have long been in use for conveying heat to endothermic processes, for example, in supplying heat to the cracking step found in two process types for catalytically cracking gas oils. One type, fluid catalytic cracking (FCC), employs a fine catalytic powder (herein called "FCC catalyst") to carry heat from a combustion step (removing carbon from the catalyst) to an endothermic cracking step. In some embodiments of the FCC cracking process, the two steps are mounted side-by-side, so that at least a portion of the travel of FCC catalyst between the two steps is horizontal. Note, however, that horizontal travel distance is small relative to ground occupied by a petroleum refinery that the FCC cracking process serves. A second type, gravitating-bed cracking, employs a catalyst in form of "beads" of about 3 mm (⅛ inch) diameter. In substantially all modern embodiments of gravitating-bed cracking, the two steps (cracking and catalyst-regenerating combustion) are mounted vertically, one above the other, catalyst beads experiencing substantially no sideways travel.

Wider usefulness of a fine or coarse powder for carrying heat requires better means for conveying a hot powder horizontally, even when distance of travel is relatively large, with something approaching the ease of moving a condensed-ring-hydrocarbon liquid horizontally (or a molten salt or mercury vapor). Conventional arrangements for pneumatic conveying of a dry powder horizontally within a pipe—the powder moving either in the "dilute phase" (whereby powder particles move either singly or in relatively small clumps or packets) or in the "dense phase" (whereby particles move in "plugs" separated by "empty" intervals, occupied by gas)—suffer two handicaps: first, a pressure gradient necessary to sustain the powder/gas motion can be large; second, if a hot powder be employed as a carrier of heat, either conveying gas must be heated to substantially the temperature of the powder or a reduction in this temperature must be accepted through introduction of cooler gas.

These disabilities also characterize a system for pneumatic powder conveying disclosed in U.S. Pat. No. 3,268,264. U.S. Pat. No. 3,268,264 teaches how to cause a dry granular material to flow through a horizontal duct fitted with a porous floor, beneath which is situated a plenum supplied with a gas that fluidizes the material. Means are provided for increasing pressure of the material, to make good a drop in this pressure between a granular-material-entry end and granular-material-exit end of the duct. For purpose of engineering design, this pressure drop can be estimated by integrating point pressure gradients along the duct; these can be estimated by applying a standard correlation for flow of air and water through a horizontal duct of similar dimensions. Recall that air and water, when flowing together in an enclosed, horizontal duct, separate into two "layers": water flows in a lower layer, and air flows in an upper layer occupying a "supernatant" space above the flowing water. The air speed is significantly greater that the speed of the water. U.S. Pat. No. 3,268,264 teaches that the same physical separation occurs when fluidized granular material flows in an enclosed, horizontal duct: expansion of the fluidized material from its settled state is small; the material flows in a "dense-phase" layer below a "supernatant" space within which fluidizing gas gradually accumulates; gas moves in this space at a speed significantly higher than the speed of the material layer. When employing a standard correlation for horizontal flow of air and water for estimating the pressure gradient required at a given point to sustain a desired flow of granular material, one should remember that not all gas reports to the supernatant space: some gas remains in interstices within the material.

It is evident that an improved system for horizontal conveying of a dry powder can be useful for tasks other than the conveying of heat. Lower pressure drop and a lesser requirement for conveying gas would be advantageous for the horizontal conveying of many economically significant powders, such as, for example, cement powder and grains like wheat, soy, rice, corn, etc., whose horizontal conveying is often a significant step either in charging the material to a process, committing it to long-term storage, or feeding it to means for its long-distance transport.

A fine powder ideal for use as a heat carrier is readily at hand, and, potentially, available at a low cost. Each year the petroleum industry discards spent FCC catalyst in the hundreds or thousands of tons. Fluidization by a gas places FCC catalyst in a liquid-like state displaying an effective "viscosity" smaller than that of water. When fluidized, the powder "imbibes" a moiety of gas, expanding just a bit in volume. The expansion greatly reduces the number of particle-particle contacts present within the powder at a given moment (accounting for its low effective viscosity). Derek Geldart supplied a classification of powders denoting their several distinct behaviors when fluidized by a gas (see Squires, Kwauk, and Avidan, *Science*, vol. 230, pp. 1329-1337, 1985). FCC catalyst is typical of the class of powders that Geldart designated "Group A". In conventional parlance, a Group A powder would be called a "fine powder"; more appropriately, a Group A powder is called an "aeratable powder".

Those skilled in vibration arts have long appreciated that vertical vibration at sufficient intensity confers a liquid-like character upon a granular medium (either "fine" or "coarse"). Thomas, Mason, Liu, and Squires (*Powder Technology*, vol. 57, pp. 267-280, 1989) reviewed engineering literature on vibrated powders from 1940 onward. The liquid-like character of a suitably vibrated granular medium resembles the character of this medium when fluidized by a gas. That is to say, when a stirring rod is introduced into either the vibrated or fluidized medium, application of a similar, small force is sufficient to move the rod from side to side; in both instances, the apparent viscosity of the medium is small, comparable to (or smaller than) the viscosity of water.

Moreover, like gas-fluidization, vertical vibration of FCC powder is capable of causing the powder to imbibe gas, the powder expanding just a little from its settled condition (see Thomas, Mason, and Squires, *Powder Technology*, vol. 111, pp. 34-49, 2000). That is to say, FCC powder is "vibrationally aeratable".

Herein, a dimensionless "vibrational intensity" (K) denotes the ratio: maximum acceleration experienced by the powder from action of the vibration divided by the acceleration of gravity, g. For sinusoidal vibration, $K=z_0\omega/g$, where $z_0$ is the maximum vertical displacement of the vibration (m); $\omega$ is angular frequency $(s^{-1})=2\pi f$; f=frequency (Hz).

Needs exist for chemically stable, easy-to-handle heat carriers and efficient heat carrying apparatus, suitable for use across a wide spectrum of temperatures.

SUMMARY OF THE INVENTION

Powder is conveyed pneumatically in a substantially horizontal direction at an exceptionally low drop in the pressure of the powder and with a negligibly small addition of conveying gas beyond that gas which is contained in interstices within the powder in the powder's settled state. This is accomplished by introducing the powder into a vibrated horizontal duct. The vibration includes a vertical component at a vibrational intensity sufficient to place the powder in a liquid-like state, and providing a step for raising the pressure of the powder, making good the drop in pressure along the duct.

For purpose of engineering design, this drop in pressure may be estimated by integrating point pressure gradients along the duct. The estimates are performed by applying a standard correlation for flow of air and water in a horizontal duct of like dimensions. In applying the correlation, it is noted that volume occupied by the flowing powder remains substantially constant, and so a drop in powder pressure is accompanied by a loss of gas from interstices within the powder, this gas accumulates in a supernatant gas space above the flowing powder, a space in which gas moves at a speed higher than that of the powder.

Significantly, hot powder in a vibration-induced liquid-like state may be advantageously used to convey heat horizontally in the vibrated duct of the instant invention, since the conveying of the hot powder entails substantially no detrimental dilution of the powder through introduction of a conveying gas (either cooling the powder or requiring a step for heating the gas).

In an application of the invention for conveying heat horizontally, powder is heated in an exothermic operation and, after horizontal travel through a vibrated duct, furnishes heat to an endothermic process, from which it is advantageously returned to the exothermic process through a second duct of the invention. For example, the exothermic operation heating the powder may include a combustion conducted in a fluid bed of the powder, and the endothermic operation cooling the powder could comprise an endothermic chemical reaction (e.g., the catalytic reaction of methane with steam, yielding a mixture of carbon monoxide and hydrogen) conducted within metal tubes embedded within a fluid bed of the powder. Although the two ducts are substantially horizontal, it should be understood that the powder's travel might include hills and valleys, i.e., significant rises and falls in elevation.

The present invention is a major improvement upon the teaching of the aforementioned U.S. Pat. No. 3,268,264. In the practice of the earlier patent, a significant quantity of fluidizing gas accumulates in a supernatant space above the moving powder, and both powder velocity and pressure gradient markedly increase in the direction of powder travel. If the distance is great, gas-bleed-off stations may be required along the route of travel in order to keep within reasonable bounds the pressure gradient necessary to drive powder along the conveying duct. Powder velocity and pressure gradient increase more slowly along a duct of the instant invention; a given flow of powder entails a smaller drop in pressure.

The Group-A character of discarded ("spent") FCC catalyst (herein called "Soltherm"), and potentially its low cost, make the Soltherm ideal for practice in the present invention. Other powders falling in the Geldart Group-A classification are also ideal. So, too, are powders in Geldart's Group B, if their properties (size and density), taken together with properties of the conveying gas, place them close to the borderline between Group A and Group B; the aforementioned paper by Thomas, Mason, and Squires reported a cyclic expansion and contraction of the volume occupied by one such powder by an absolute 2% when vibrated at intensity K=4 and frequency f 25 Hz.

Relative to Dowtherm heat carriers, Soltherm in general has the advantage of greatly reducing the quantity of heat-transfer surface required to receive heat or deliver it. For example, Soltherm can be heated directly in a fluid-bed combustion. Dowtherms are poor conductors of heat, and heat-transfer coefficients for delivering heat from a Dowtherm pool to surfaces therein are small relative to coefficients for delivering heat from a fluid bed of Soltherm.

For some useful applications of the instant invention, a granular medium of larger particle size is appropriate. In general, grains that are products of agriculture are relatively large, either Group B or Group D powders in Geldert's classification. Beads employed in gravitating-bed catalytic cracking are a Group D powder. An installation for this process may place cracking and catalyst-regeneration steps side by side, conveying catalyst beads back and forth between the steps in vibrating ducts. The arrangement removes a disadvantage of modern designs for this cracking process type, viz., their great height relative to FCC designs.

Well suited for practice in the present invention are vibrational intensity K between about 3 and 6 and frequency f between about 15 and 35 Hz.

A number of means may be used to elevate the pressure of a heat-carrying powder. For Soltherm, the aerated standpipe of fluidization arts is a preferred means. During an extended time of use of this powder as a heat carrier, however, it may suffer loss of finer material initially present therein, reducing its Group A character—i.e., moving it toward the Group B/Group A boundary. To meet this contingency, vibration of an aerated standpipe will help its performance (tending to prevent "bridges" that can form, blocking downward motion of the powder). Vibration of an aerated standpipe also facilitates its use to raise the pressure of a powder that is (marginally) in Geldart's Group B category.

Other means for raising the pressure of a comminuted solid are the various types of solid pumps on offer (such as the Fuller-Kinyon and Moyno pumps and the Lockheed extruder). Lock-hoppers may also be used; see U.S. Pat. No. 3,719,193 for an improved lock-hopper system that avoids a significant loss of energy from conventional lock-hoppering.

An object of the present invention is to provide a chemically stable heat carrier suitable for supplying heat at temperatures beyond 1,000 C.

Another object is to provide a heat-carrier conveying system, capable of delivering heat across a considerable distance.

Another object is to dispose of heat removed from an exothermic chemical process.

Another object is to supply heat to an endothermic chemical process.

Another object is to convey solar heat, collected at a high temperature, to an operation utilizing the heat at substantially this high temperature.

Another object is to convey heat from nuclear fission, supplied at a high temperature, to an operation utilizing the heat at substantially this high temperature.

Another object is to supply heat for raising steam at a distance from the source of the heat.

Another object is to provide a system for the horizontal pneumatic conveying of a dry powder with negligible addition of conveying gas other than gas contained in interstices within the powder.

Another object is to provide a system for the horizontal pneumatic conveying of a powder characterized by small loss in pressure of the powder.

The invention relates to apparatus for delivering heat from a heat-producing operation to a heat-consuming operation separated horizontally one from another. The apparatus includes a powder; means for heating the powder in the heat-producing operation; a duct for conveying heated powder from the heat-producing operation to the heat-consuming operation and means for introducing heated powder into the duct; means for cooling the powder in the heat-consuming operation; a duct for conveying cooled powder from the heat-consuming operation to the heat-producing operation and means for introducing cooled powder into the duct; means for vibrating the two ducts, the vibration including a vertical component at a vibrational intensity sufficient to place the heated or cooled powder in a liquid-like state; and means for raising the pressure of the powder, thereby making good the drop in pressure along each of the two ducts.

The invention also relates to apparatus for conveying a dry powder horizontally. The apparatus includes a substantially horizontal duct; means for introducing the dry powder into a first end of the duct; means for vibrating the duct, the vibration including a vertical component at a vibrational intensity sufficient to place the powder in a liquid-like state; means for withdrawing the powder from a second end of the duct; and means for raising the pressure of the powder, making good a drop in pressure along the duct.

The invention also relates to a method for delivering heat from a heat-producing operation to a heat-consuming operation separated horizontally one from another. The method includes heating a powder in the heat-producing operation; introducing the heated powder into a duct extending from the heat-producing operation to the heat-consuming operation; cooling the powder in the heat-consuming operation; introducing the cooled powder into a duct extending from the heat-consuming operation to the heat-producing operation; vibrating each of the two ducts, the vibration including a vertical component at a vibrational intensity sufficient to place the powder situated within the ducts in a liquid-like state; raising the pressure of the powder, thereby making good a drop in pressure along each of the two ducts.

The invention also relates to a method for conveying a dry powder horizontally. The method includes vibrating a horizontal duct, the vibration including a vertical component at a vibrational intensity sufficient to place a dry powder situated within the duct in a liquid-like state; introducing the dry powder at a first end of the duct; withdrawing the powder at a second end; and raising the pressure of the powder, making good a drop in pressure along the duct between the first and second ends.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
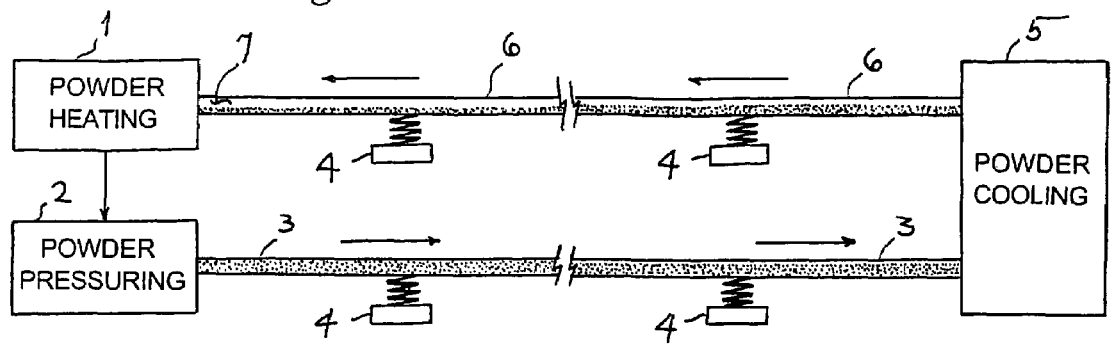
FIG. 1 is a schematic illustration of a cyclic operation using a powder to convey heat across a horizontal distance that separates a heat-producing from a heat-consuming operation.

FIG. 1 is a schematic sketch of a system for conveying heat across a horizontal distance that separates heat-producing step 1 from heat-consuming step 5. Step 1 is fitted with means for heating a powder and delivering the heated powder to powder-pressuring means 2, which feeds powder to vibrating duct 3. Vibrators 4 impart a generally vertical vibratory motion to duct 3 at vibrational intensity K=4 and frequency f=25 Hz. The vibration is at an intensity sufficient to place powder within the duct into a liquid-like state. A declining pressure in duct 3 causes the heated powder to move across the aforesaid horizontal distance; duct 3 delivers the powder to step 5. Step 5 has means for cooling the powder and delivers the cooled powder to duct 6, to which vibrators 4 impart a generally vertical vibratory motion at a vibrational intensity K=4 and frequency f=25 Hz. A declining pressure in duct 6 causes the cooled powder to return across the aforementioned distance; duct 6 delivers the powder to step 1. As the powder loses pressure in its travel through ducts 3 and 6, gas initially present within the powder's interstices expands, while the powder's volume expands relatively little. The expanded gas collects in supernatant space 7, a space above the flowing powder (best seen in the drawing near the outlet end of duct 6); gas in space 7 moves at a faster speed than the powder.

Spent FCC catalyst (Soltherm, a discard of petroleum refining industry) is a preferred powder for employment in the system of FIG. 1.

Figure 2:
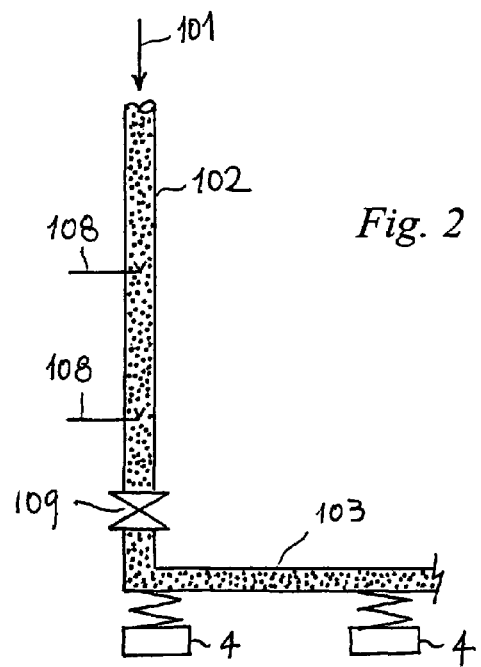
FIG. 2 illustrates a vibrated-standpipe means for pressurizing a heat-carrying powder.

FIG. 2 is a schematic sketch of a preferred standpipe arrangement for step 2 when Soltherm is chosen as the powder for carrying heat. Heated Soltherm at 101 enters standpipe 102 and flows downward, receiving aeration from a multiplicity of lines 108. These furnish the additional gas required within Soltherm's interstices as pressure therein increases during Soltherm's downward motion in the standpipe. Valve 109 controls the rate of flow of the heated, pressured Soltherm into duct 103. Vibrators 4 impart a substantially vertical vibration to both standpipe 102 and duct 103 at K=4 and frequency f=25 Hz.

The following is an example application of the system of FIGS. 1 and 2 for delivering heated Soltherm across a significant distance (e.g., in a large chemical-processing complex). The length of duct 3 in FIG. 1 (a.k.a. duct 103 in FIG. 2) is one-half kilometer (about one-third mile); its diameter is 300 mm (about 11.8 inches). Soltherm flows in duct 3 at 88 kg/s (350 tons/hour), losing 300 C in step 5 and thereby supplying heat to step 5 at a rate on the order of 1300 kJ/s (about 78 million BTU per hour). Powder pressure drop between entrance and exit of duct 3 is about 43 kPa (about 6.3 psi). The standpipe of FIG. 2 is suitably on the order of 7.6 m (25 ft) in height, affording the required pressure drop of about 43 kPa plus an extra drop sufficient for control of Soltherm flow rate across control valve 109.

The present invention is not limited to the preferred embodiment illustrated in the two figures. In particular, the powder-pressuring step 2 in FIG. 1 may be moved to another position in the circuit, if this is more convenient; and additional pressuring steps may be provided.

While the invention has been described with reference to specific embodiments, modifications and variations of the invention may be constructed without departing from the scope of the invention, which is defined in the following claims.

The invention claimed is:

1. Apparatus for delivering heat from a heat-producing operation to a heat-consuming operation separated horizontally one from another, comprising:
   a powder;
   means for heating said powder in said heat-producing operation;
   a duct for conveying heated powder from said heat-producing operation to said heat-consuming operation and means for introducing said heated powder into said duct;
   means for cooling said powder in said heat-consuming operation;
   a duct for conveying cooled powder from said heat-consuming operation to said heat-producing operation and means for introducing said cooled powder into said duct;
   means for vibrating said two ducts, the vibration including a vertical component at a vibrational intensity sufficient to place said heated or cooled powder in a liquid-like state, the pressure of said powder falling in said two ducts; and
   means for raising the pressure of said powder to compensate for said fall in pressure in said two ducts.

2. The apparatus of claim 1, wherein said means for raising said pressure of said powder comprises one or more aerated standpipes.

3. The apparatus of claim 1, wherein said powder is spent fluid cracking catalyst powder discarded by the petroleum industry.

4. Apparatus for conveying a dry powder horizontally, comprising:
   a horizontal duct;
   means for introducing said powder at a first pressure into a first end of said duct;
   means for vibrating said duct, the vibration including a vertical component at a vibrational intensity sufficient to place said powder in a liquid-like state;
   means for withdrawing said powder at a second pressure from a second end of said duct, wherein said second pressure is below said first pressure;
   means for raising the pressure of said powder from substantially said second pressure to substantially said first pressure.

5. The apparatus of claim 4, wherein said vibration is at a frequency f between about 15 and about 35 Hertz and said vibrational intensity K is between about 3 and about 6.

6. A method for delivering heat from a heat-producing operation to a heat-consuming operation separated horizontally one from another, comprising:
   heating a powder in said heat-producing operation and introducing said heated powder into a duct extending from said heat-producing operation to said heat-consuming operation;
   cooling said heated powder in said heat-consuming operation and introducing said cooled powder into a duct extending from said heat-consuming operation to said heat-producing operation;
   vibrating each of said two ducts, the vibration including a vertical component at a vibrational intensity sufficient to place a powder situated within said ducts in a liquid-like state, the pressure of said powder falling in said two ducts; and
   raising the pressure of said powder to compensate for said fall in pressure in said two ducts.

7. The method of claim 6, wherein raising said pressure of said powder is by action of one or more aerated standpipes.

8. The method of claim 6, wherein said powder is spent fluid cracking catalyst powder discarded by the petroleum industry.

9. A method for conveying a dry powder horizontally, comprising:
   vibrating a horizontal duct, the vibration comprising a vertical component having a vibrational intensity sufficient to place a dry powder situated within said duct in a liquid-like state;
   introducing said dry powder at a first pressure at a first end of said duct;
   withdrawing said powder at a second pressure at a second end of said duct, wherein said second pressure is below said first pressure;
   raising the pressure of said powder from substantially said second pressure to substantially said first pressure.

10. The method of claim 9, wherein said vibration is at a frequency f between about 15 and about 35 Hertz and said vibrational intensity K is between about 3 and about 6.

* * * * *

UNITED STATES PATENT AND TRADEMARK OFFICE
CERTIFICATE OF CORRECTION

PATENT NO. : 7,255,556 B1  
APPLICATION NO. : 11/071161  
DATED : August 14, 2007  
INVENTOR(S) : Arthur M. Squires Page 1 of 1

It is certified that error appears in the above-identified patent and that said Letters Patent is hereby corrected as shown below:

Column 4, line 48, change "f 25 Hz" to --f=25 Hz--.

Signed and Sealed this

Twenty-fifth Day of December, 2007

JON W. DUDAS  
*Director of the United States Patent and Trademark Office*